United States Patent
Son et al.

(10) Patent No.: US 8,974,246 B2
(45) Date of Patent: Mar. 10, 2015

(54) MOBILE TERMINAL

(71) Applicant: LG Electronics Inc., Seoul (KR)

(72) Inventors: Youngchul Son, Seoul (KR); Jeongho Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 123 days.

(21) Appl. No.: 13/756,266

(22) Filed: Jan. 31, 2013

(65) Prior Publication Data

US 2013/0288531 A1 Oct. 31, 2013

(30) Foreign Application Priority Data

Apr. 30, 2012 (KR) .................... 10-2012-0045268

(51) Int. Cl.
| | |
|---|---|
| *H01R 3/00* | (2006.01) |
| *H01R 4/48* | (2006.01) |
| *H01R 13/24* | (2006.01) |
| *H04M 1/02* | (2006.01) |

(52) U.S. Cl.
CPC .......... *H01R 4/4809* (2013.01); *H01R 13/2428* (2013.01); *H04M 1/0262* (2013.01)
USPC ............................ 439/500; 439/862; 439/627

(58) Field of Classification Search
USPC ......................................... 439/627, 500, 862
See application file for complete search history.

(56) References Cited

U.S. PATENT DOCUMENTS

| | | | | |
|---|---|---|---|---|
| 7,731,509 B1* | 6/2010 | Zhang | .............................. | 439/81 |
| 7,806,739 B2* | 10/2010 | Hu et al. | ....................... | 439/862 |
| 8,047,857 B1* | 11/2011 | Lu et al. | ........................... | 439/83 |
| 8,079,875 B2* | 12/2011 | Ho | ................................ | 439/627 |
| 8,123,551 B1* | 2/2012 | Liu et al. | ....................... | 439/500 |

* cited by examiner

*Primary Examiner* — Xuong Chung Trans
(74) *Attorney, Agent, or Firm* — Birch, Stewart, Kolasch & Birch, LLP (57) ABSTRACT

A mobile terminal is provided. The mobile terminal includes a case having a battery loading part to load a battery thereon, a printed circuit board mounted in the case, a terminal connection accommodating space formed in a predetermined portion of the battery loading part and extending in a first direction, a connection terminal comprising a fixing part configured to be connected to the printed circuit board, a connecting part extending toward the battery loading part via the terminal connection accommodating space, and a flexible part having a plurality of curved portions arranged between the fixing part and the connecting part and a stopper extending in the terminal connection accommodating space to restrict contraction of the flexible part in the first direction by coming into contact with one of the curved portions when the flexible part is contracted.

15 Claims, 11 Drawing Sheets

MOBILE TERMINAL

Pursuant to 35 U.S.C. §119(a), this application claims the benefit of earlier filing date and right of priority to Korean Application No.10-2012-0045268, filed on Apr. 30, 2012, the contents of which are hereby incorporated by reference herein in their entirety.

BACKGROUND OF THE DISCLOSURE

1. Field of the Disclosure

The present invention relates to a mobile terminal having a battery connection terminal that is able to reduce the thickness thereof.

2. Discussion of the Related Art

A mobile terminal is a device which may be configured to perform various functions. Examples of such functions include data and voice communications, capturing images and video via a camera, recording audio, playing music files and outputting music via a speaker system, and displaying images and video on a display. Some terminals include additional functionality which supports game playing, while other terminals are also configured as multimedia players. More recently, mobile terminals have been configured to receive broadcast and multicast signals which permit viewing of contents, such as videos and television programs.

Generally, terminals can be classified into mobile terminals and stationary terminals according to a presence or non-presence of mobility. And, the mobile terminals can be further classified into handheld terminals and vehicle mount terminals according to availability for hand-carry.

As the functions of the mobile terminal are versatile, a problem of power supply has been issued and durability is important in a connection structure of a detachable battery. Simultaneously, connection reliability and a small volume are necessary in the connection structure of the detachable battery, even if such a battery is repeatedly mounted and demounted.

SUMMARY OF THE DISCLOSURE

Accordingly, the present invention is directed to a mobile terminal that substantially obviates one or more problems due to limitations and disadvantages of the related art. An object of the present invention is to provide a mobile that is able to lower a recognition failure rate.

Additional advantages, objects, and features of the disclosure will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a mobile terminal includes a case in which a printed circuit board is mounted, the case comprising a battery loading part to load a battery thereon; a terminal connection accommodating space formed in a predetermined portion of the battery loading part in a horizontal direction; a connection terminal comprising a fixing part fixed to be connected with the printed circuit board mounted in the case, a connecting part projected toward the battery loading part via the terminal connection accommodating space, and a flexible part having a plurality of curved portions arranged between the fixing part and the connecting part; and a stopper projected in the terminal connection accommodating space to restrict horizontal-direction contraction of the flexible part, in contact with one of the curved portion when the flexible part is contacted.

The stopper may contact with a first curved part out of the curved portions positioned nearest to the connecting part.

The first curved portion may be positioned in an upper position and the stopper may be positioned beyond the terminal connection accommodating space.

The first curved portion of the flexible part may contact with the stopper and only the first curved portion may be elastically deformed after that, to allow the connecting part to rotate with respect to the first curved portion.

The mobile terminal may further include a mold coupled to a predetermined portion of the battery loading part, the mold configured to define a top side and a lateral side of the terminal connection accommodating space, wherein a bottom side of the terminal connection accommodating space is defined by an outer side of the case.

A stopper coupling groove may be formed in a top side of the mold, and the stopper may be inserted in the stopper coupling groove in an up and down direction, to be projected inside the terminal connection accommodating space.

The mold may be an integrated type configured to define top surfaces and lateral walls of a plurality of terminal connection accommodating spaces, and the stopper may be an integrated type configured to be coupled to the plurality of the terminal connection accommodating spaces simultaneously.

The mold may be an integrated type configured to define top surfaces and lateral walls of a plurality of terminal connection accommodating spaces, and a plurality of stoppers may be coupled to the plurality of the terminal connection accommodating spaces, respectively.

The stopper may be projected from a top side of the mold in a downward direction to be integrally formed with the mold.

The mold may consist of a plurality of unit molds configured and one unit mold may define a lateral wall and a top side of one terminal connection accommodating space, and the plurality of the stoppers may be provided in the plurality of the unit molds, respectively.

The mold may further include a coupling hole formed through a top side of the mold in an up and down direction; and a fitting member inserted in the coupling hole to couple an end thereof to the case or the printed circuit board.

The connecting part may be formed by bending the other end of the connection terminal to make a lateral side thereof triangle-shaped.

The connecting part may further include a reinforcing part formed in a lateral side thereof. The reinforcing part may be formed by bending wing part projected from both sides of the connection terminal in a width direction.

The fixing part may be formed wider than the range of the connection terminal.

The present invention has following effects. According to at least one of the embodiments, the mobile terminal can reduce the height of the battery connection terminal, only to make the mobile terminal simmer and that the connection terminal 200 can perform the horizontal movement and the rotational movement, only to lower a connection failure rate.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DESCRIPTION OF SPECIFIC EMBODIMENTS

In the following detailed description, reference is made to the accompanying drawing figures which form a part hereof, and which show by way of illustration specific embodiments of the invention.

As used herein, the suffixes 'module', 'unit' and 'part' are used for elements in order to facilitate the disclosure only. Therefore, significant meanings or roles are not given to the suffixes themselves and it is understood that the 'module', 'unit' and 'part' can be used together or interchangeably.

The present invention can be applicable to a various types of mobile terminals. Examples of such terminals include mobile phones, user equipments, smart phones, digital broadcast receivers, personal digital assistants, laptop computers, portable multimedia players (PMP), navigators and the like.

Yet, it is apparent to those skilled in the art that a configuration according to an embodiment disclosed in this specification is applicable to such a fixed terminal as a digital TV, a desk.

Figure 1:
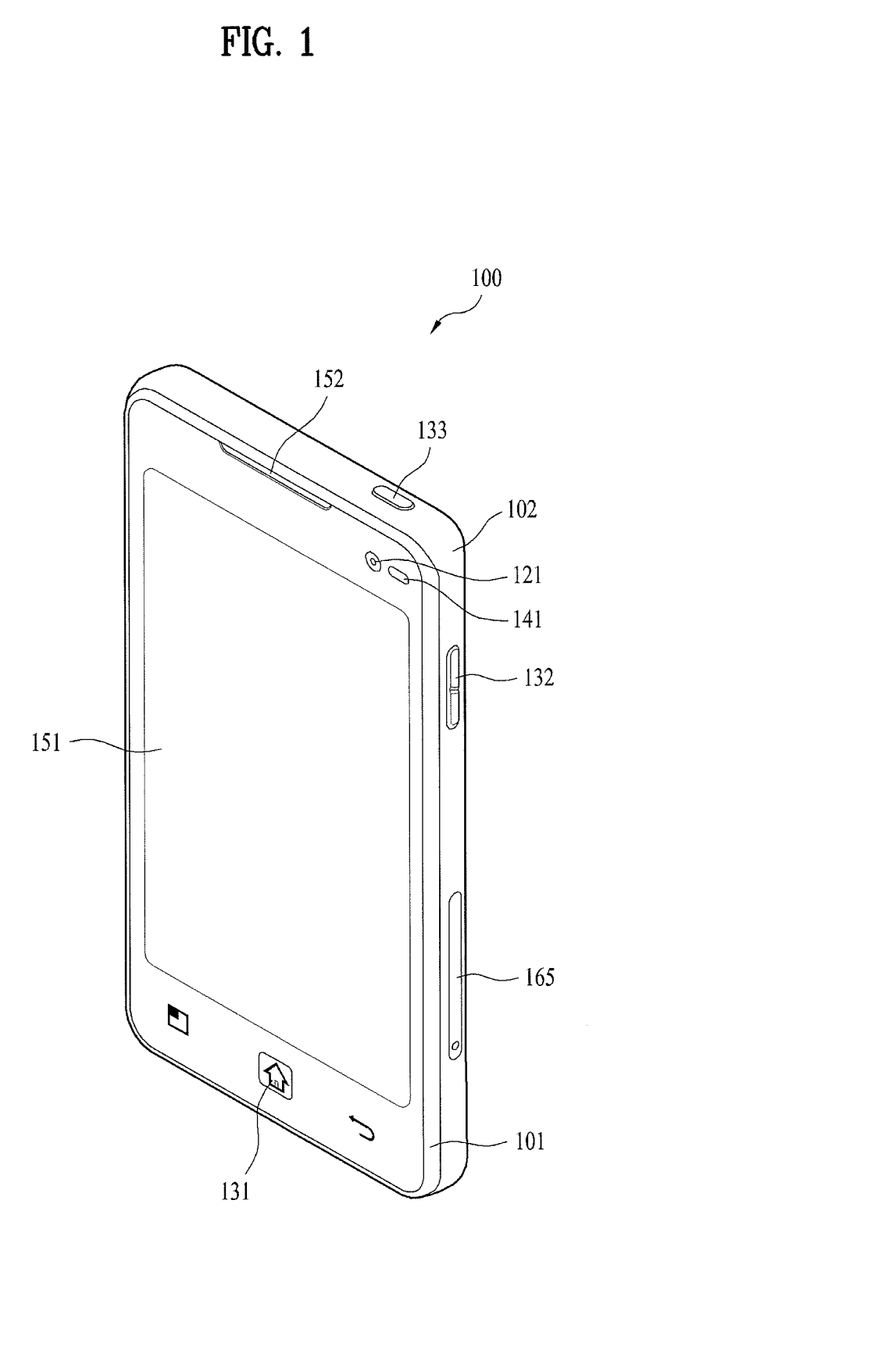
FIG. 1 is a front perspective diagram of a mobile terminal according to one embodiment of the present invention.

FIG. 1 is a front perspective diagram of a mobile terminal according to one embodiment of the present invention.

The mobile terminal 100 shown in the drawing has a bar type terminal body. Yet, the mobile terminal 100 may be implemented in a variety of different configurations. Examples of such configurations include folder-type, slide-type, rotational-type, swing-type and combinations thereof. For clarity, further disclosure will primarily relate to a bar-type mobile terminal 100. However such teachings apply equally to other types of mobile terminals.

Referring to FIG. 1, the mobile terminal 100 includes a case 101, 102, 103 (see FIG. 2) configuring an exterior thereof In the present embodiment, the case can be divided into a front case 101 and a rear case 102. Various electric/electronic parts are loaded in a space provided between the front and rear cases 101 and 102.

Occasionally, electronic components can be mounted on a surface of the rear case 102. The electronic part mounted on the surface of the rear case 102 may include such a detachable part such as a battery, a USIM card, a memory card and the like. In doing so, the rear case 102 may further include a backside cover 103 configured to cover the surface of the rear case 102. In particular, the backside cover 103 has a detachable configuration for the user's convenience. If the backside cover 103 is detached from the rear case 102, the surface of the rear case 102 is exposed.

Figure 2:
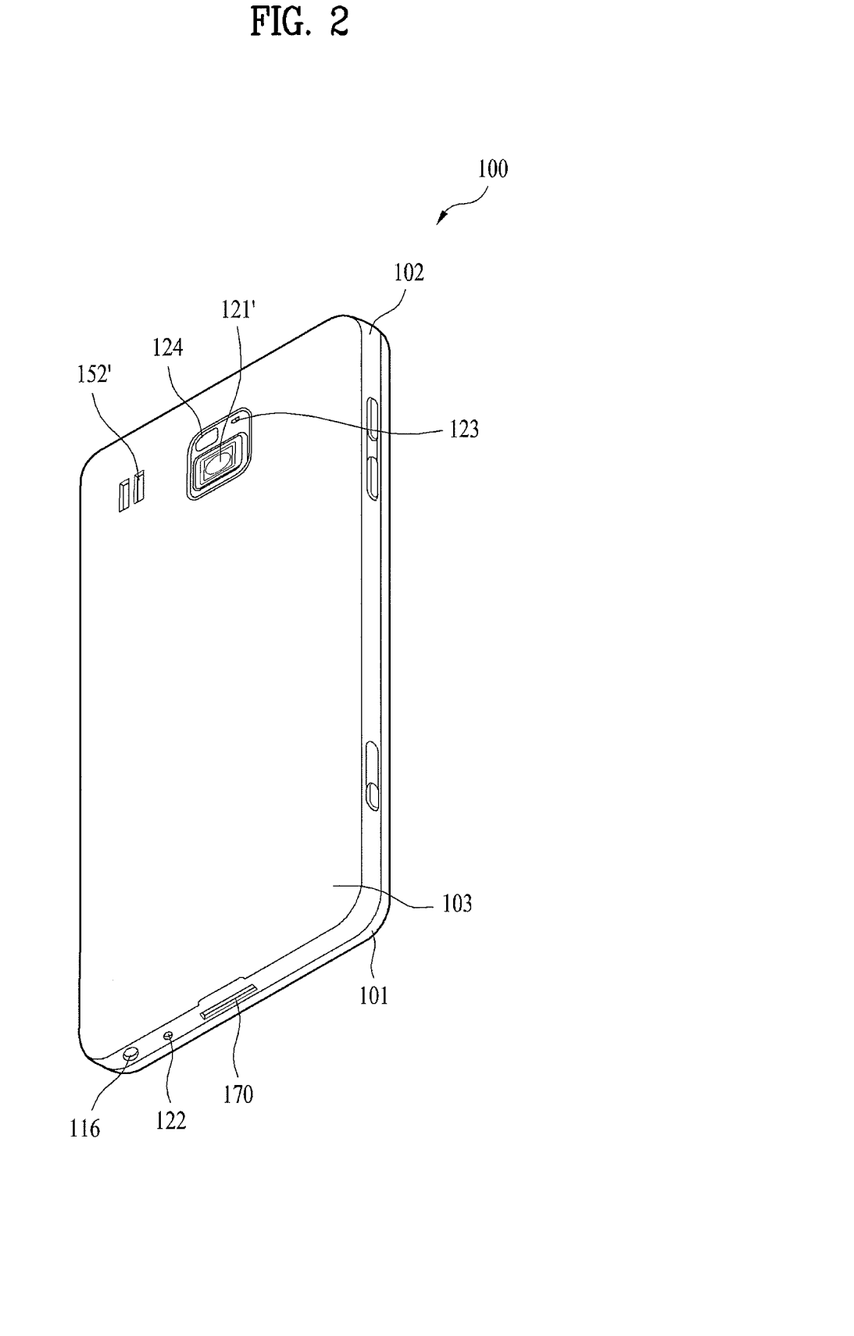
FIG. 2 is a rear perspective diagram of a mobile terminal according to one embodiment of the present invention.

Referring to FIG. 2, if the backside cover 103 is attached to the rear case 102, a lateral side of the rear case 102 may be exposed in part. If a size of the backside cover 103 is decreased, a rear side of the rear case 102 may be exposed in part.

The cases 101, 102 and 103 can be formed by injection molding of synthetic resin or can be formed of metal substance such as stainless steel (STS), titanium (Ti) or the like for example.

A display 151, an audio output unit 152, a camera 121, user input units, which may include manipulating units 131, 132 and 133, a microphone 122, an interface 170 and the like can be provided to the case 101 or 102.

The display 151 occupies most of a main face of the front case 101. The audio output unit 152 and the camera 121 are provided to an area adjacent to one of both end portions of the display 151, while the user input unit 131 and the microphone 122 are provided to another area adjacent to the other end portion of the display 151. The user input unit 132 and the interface 170 can be provided to lateral sides of the front and rear cases 101 and 102.

The input unit 130 is manipulated to receive a command for controlling an operation of the terminal 100. And, the input unit is able to include a plurality of manipulating units 131 and 132. The manipulating units 131 and 132 can be named a manipulating portion and may adopt any mechanism of a tactile manner that enables a user to perform a manipulation action by experiencing a tactile feeling.

Content input by the first or second manipulating unit 131 or 132 can be diversely set. For instance, such a command as start, end, scroll and the like is input to the first manipulating unit 131. In addition, a command for a volume adjustment of sound output from the audio output unit 152 and the like can be input to the second manipulating unit 132, a command for a switching to a touch recognizing mode of the display 151 and the like can be input to the second manipulating unit 132.

A button type is configured to recognize a pressure applied by a user to each of the manipulation units 131, 132 and 133. If a touch sensor is provided to each of the manipulation units 131, 132 and 133 in addition to the display unit 151, a user's command can be inputted by a user's touch.

FIG. 2 is a perspective diagram of a backside of the terminal shown in FIG. 1.

Referring to FIG. 2, the camera 121' can be additionally provided to a backside of the terminal body, and more particularly, to the rear case 102. The camera 121 has a photographing direction that is substantially opposite to that of the former camera 121 shown in FIG. 1 and may have pixels differing from those of the firmer camera 121.

Preferably, for instance, the camera 121 has low pixels enough to capture and transmit a picture of user's face for a video call, while the latter camera 121' has high pixels for capturing a general subject for photography without transmitting the captured subject. In addition, each of the cameras 121 and 121' can be installed at the terminal body to be rotated or popped up.

A flash 123 and a mirror 124 are additionally provided adjacent to the camera 121'. The flash 123 projects light toward a subject in case of photographing the subject using the camera 121'. In case that a user attempts to take a picture of the user (self-photography) using the camera 121', the mirror 124 enables the user to view user's face reflected by the mirror 124.

An additional audio output unit 152' can be provided to the backside of the terminal body. The additional audio output unit 152' is able to implement a stereo function together with the former audio output unit 152 shown in FIG. 2A and may be used for implementation of a speakerphone mode in talking over the terminal.

A broadcast signal receiving antenna 116 can be additionally provided to the lateral side of the terminal body as well as an antenna for communication or the like. The antenna 116 constructing a portion of the broadcast receiving module can be retractably provided to the terminal body.

Figure 3:
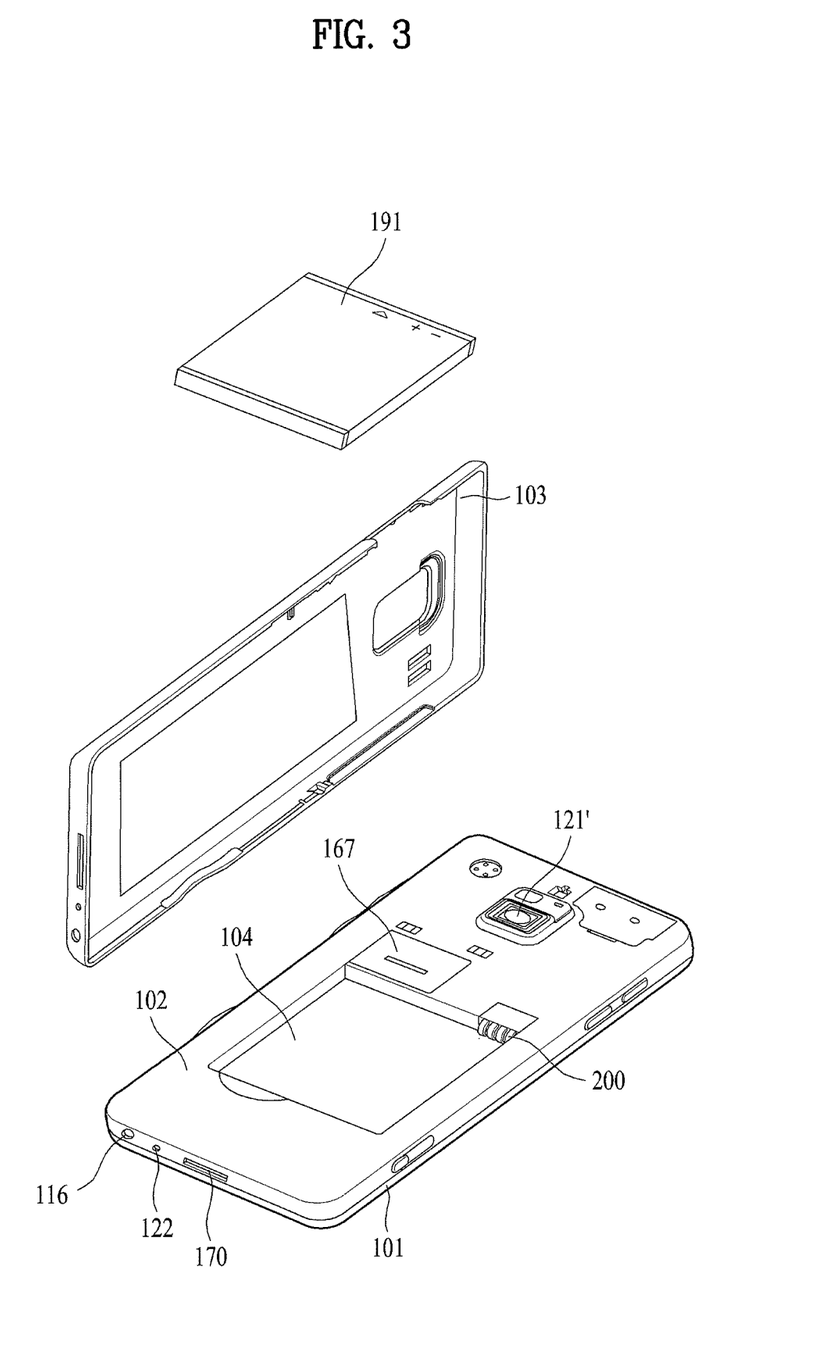
FIG. 3 is a cut-away perspective diagram of a back cover for a back side of a mobile terminal according to one embodiment of the present.

FIG. 3 is a perspective diagram of a mobile terminal according to one embodiment of the present invention, in which a surface of a rear case is shown by detaching a rear cover of the mobile terminal.

Referring to FIG. 3, a mobile terminal according to one embodiment of the present invention may include the front case 101, the rear case 102, the rear cover (or a battery cover) 103, the camera 121', the interface 170, the microphone 122, the audio output unit 152', a battery 191, a battery loading part 104 and the like are shown. A USIM card loading part and a memory card loading part may be provided.

That is, a space for receiving such an external component as the battery loading part 104, the USIM card loading part, the memory card loading part and the like may be provided to a surface of the rear case 102. Generally, the external components mounted on the surface of the rear case 102 are provided to extend functions of the mobile terminal 100 to meet the user's demands for the diversified functions of the mobile terminal 100.

As the functions of the mobile terminal 100 are diversified, the battery 191 may be a replaceable type, as shown in FIG. 3, to supplement considerable power consumption of the mobile terminal 100. In case of the replaceable type battery, the battery loading part 104 may be formed on the surface off the rear case 102. And in addition, a connecting terminal 200 may be provided to the battery loading part 104 to be connected with a component installed inside the case.

As the functions of the mobile terminal 100 are diversified, the battery 191 can be configured of a replaceable type shown in FIG. 3 to supplement the considerable power consumption of the mobile terminal 100. In case of the rechargeable battery 191, a battery loading part 104 may be formed on the surface of the rear case 102. A connection terminal 200 may be provided in the battery loading part 104 to be connected with a component mounted in the case.

The battery loading part 104 includes a connection terminal 200 inserted in a terminal connection accommodating space 250 and the terminal connection accommodating space 250 is formed in a predetermined portion of the battery loading part 104. An end of the connection terminal 200 is electrically connected with an inner electronic component of the mobile terminal to supply the power transferred from the battery and the other end of the connection terminal 200 is elastically inserted in or discharged from the terminal connection accommodating space 250 to support the battery fixed to the battery loading part 104.

The connection terminal 200 according to the present invention is horizontally moving and then rotating to be inserted in the terminal connection accommodating space 250, in case the battery 191 is inserted. The detailed structure of the connection terminal 200 and the terminal connection accommodating space 250 will be described later.

As shown in FIG. 3, a card loading part 167 may be formed next to the battery loading part 104 or in a bottom surface of the battery loading part 104. When the battery 191 is separated from the battery loading part 104, the card loading part 167 may be exposed outside. In this instance, the size of the battery loading part 104 can be increased to enable magnification of the battery 191.

FIG. 3 shows that the card loading part 167 is mounted in a back side of the rear case 102. However, the card loading part 167 may be inserted in or separated from a lateral side of the mobile terminal 100 as an insertion type.

The back side cover 103 may cover a back side of the rear case 102 and it may fix the battery 191, the USIM card, the memory card and so on mounted in the back side of the rear case 102 not to separate them there from. Accordingly, the back side cover 103 may protect such external components from external shocks or foreign substances. Recently, a waterproof function is added to the back side cover 103 to prevent water from penetrating through the external components and there may further provided a waterproof structure (not shown) to close the rear case 102 and the back side cover 103 airtight, when they are coupled to each other.

Referring to FIGS. 4 to 8, the structure of the connection terminal composing the mobile terminal according to the present invention will be described as follows. FIGS. 4 to 8 show that the connection terminal 200, a terminal connection accommodating space 250 and a stopper 260 are provided. The connection terminal 200 consists of a fixing part 210, a connecting part 220 and a flexible part 230.

The connection terminal 200 may be provided with the electric voltages of the battery 191 to provide the electric power required by the operation of the mobile terminal 100. An end of the connection terminal 200 is connected with an electronic component installed inside the case, for example, a printed circuit board 185 and the other end of the connection terminal 200 is projected to the battery loading part 104 to be connected with the battery 191.

In other words, the end of the connection terminal 200 is electrically connected with the printed circuit board 185 arranged in the case 101 and 102 and it includes the fixing part 210 configured to fix the connection terminal 200 to the mobile terminal. The other end of the connection terminal 200 includes the connecting part 220 projected toward the battery loading part 104 to connect the connection terminal 200 with the battery and the flexible part 230 provided between the fixing part 210 and the connecting part 220.

Figure 4:
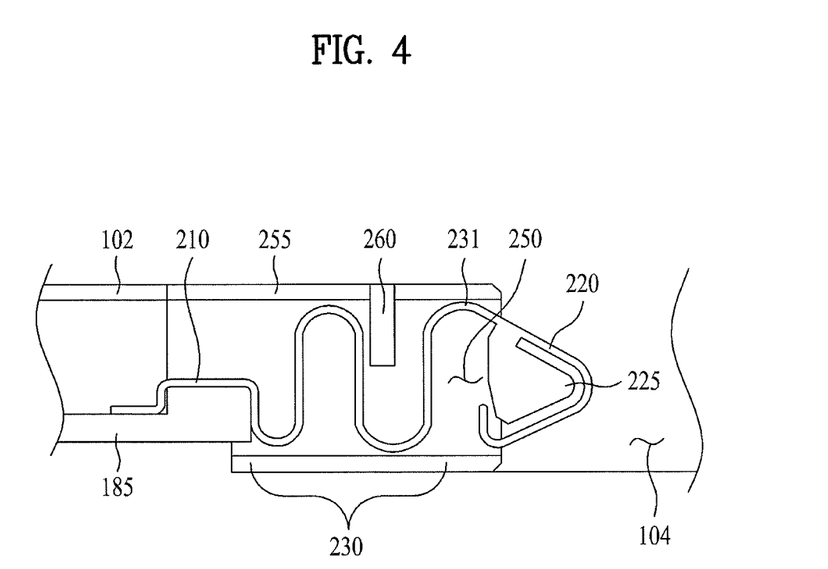
FIGS. 4 to 6 are side sectional diagrams of a battery terminal composing the mobile terminal according to the embodiment.
Figure 5:
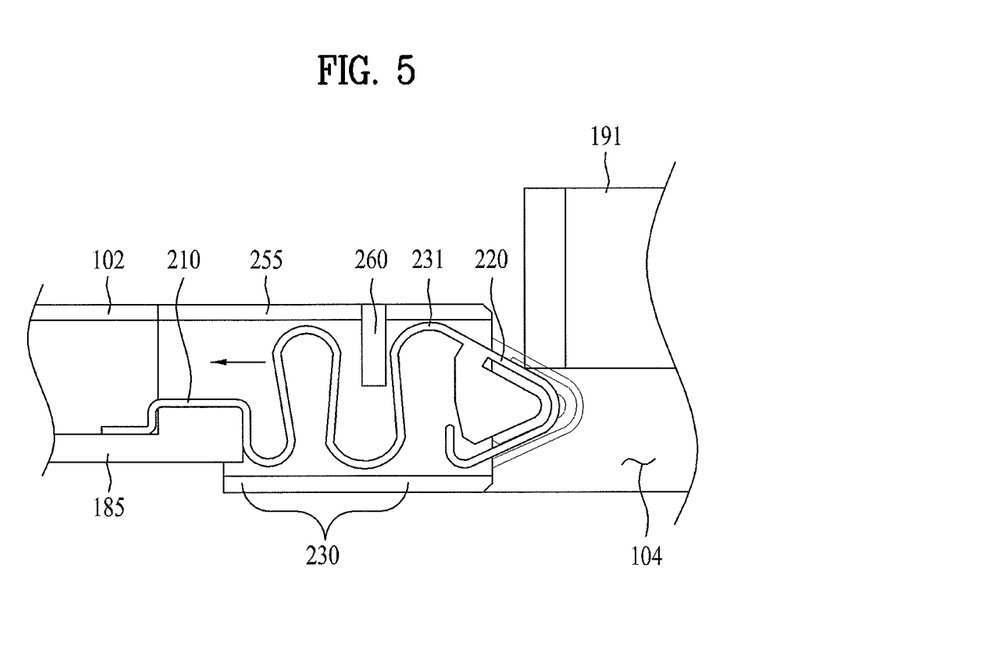
Figure 6:
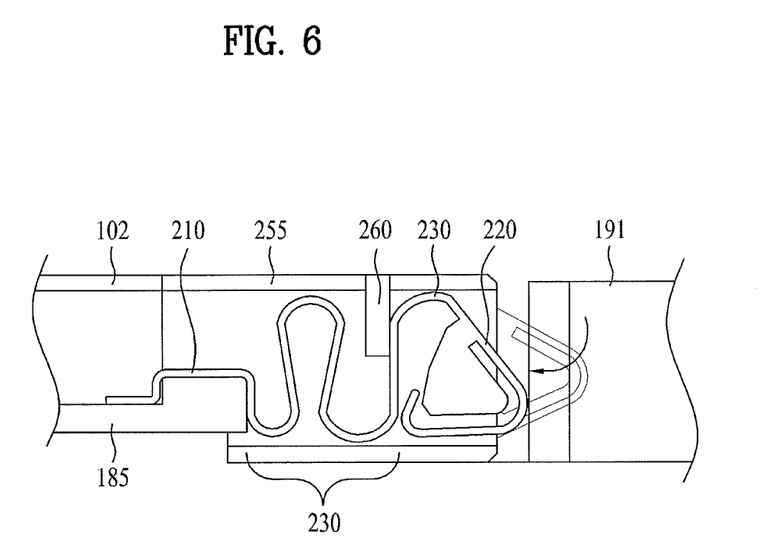

When the battery 191 is loaded, the connecting part 220 can be inserted by the flexible part 230 and the flexible part 230 pressingly applies a predetermined force to the battery 191 to prevent the battery 191 from separating from the battery loading part 104.

A horizontal-direction elastic force is necessary to press the battery 191 to present the separation of the battery 191 and it is preferred that the connecting part 220 is rotatably inserted to load the battery 191 easily.

In case there is one curved portion in the flexible part 230, the connecting part 220 is rotating on one curved portion to be inserted. In case a plurality of flexible parts 230 are provided, a plurality of flexible parts 230 are elastically deformed at the same time and an elastic force is applied in a horizontal direction.

In the former case, the horizontal direction elastic force is not applied and it is difficult to make the mobile terminal slim, because a predetermined height is required to rotate and insert the connecting part 220 in the terminal connection accommodating space 250 completely.

In the latter case, a plurality of curved portions provided in the connection terminal 200 are deformed simultaneously and moved horizontally to compensate the required height. Compared with the case providing one curved portion is provided, the height of the connection terminal can be reduced in the case providing the plurality of the curved portions. When the connection terminal 200 is moving horizontally, the insertion/separation of the connecting part 220 cannot be performed less naturally than the rotation of the connecting part 220 in the insertion/separation of the battery 191. Accordingly, a connection failure between the battery 191 and the connecting part 220 might occur.

To solve that, the connection terminal 200 of the mobile terminal according to the present invention may include the stopper 260 for the rotational motion. As well as the plurality of the curved portions as shown in FIG. 4.

The stopper 260 is projected within the terminal connection accommodating space 250 and it restricts the horizontal shrink of the flexible part, in contact with one of the curved portions. In other words, the flexible part 230 having the plurality of the curved portions is insertedly moving in a horizontal direction as shown in FIG. 5 in an initial stage, when the battery 191 is loaded. When the stopper 260 contacts with one curved portion adjacent thereto after that, the horizontal shrink of the flexible part 230 cannot be performed any further.

The stopper 260 may have a more inner position in the terminal connection accommodating space 250 than a first curved portion 231, namely, an outermost curved one in other words the nearest curved to the connecting part 220. The curved portion arranged in the inner position, compared with the stopper 260 of the connection terminal 200 of which the horizontal contraction is stopped by the stopper, is not deformed any further.

The connection terminal 200 located in an outer position, compared that the stopper 260, may have the same shape as the connection terminal having one curved portion. After that, such the connection terminal 200 is rotating with respect to the first curved portion 231 to be inserted in the terminal connection accommodating space 250. Such rotation has to be performed, fitted to the insertion direction of the battery 191. As shown in the drawing, the stopper 260 is formed beyond the terminal connection accommodating space 250 and the first curved portion 231 is curved at an upper portion of the connection terminal 200.

At this time, the connecting part 220 is already inserted in the terminal connection accommodating space 250 by the horizontal moving and the range of the rotation performed by the connection terminal according to the present invention can be smaller than that of the rotation performed by the conventional terminal having one curved portion.

Accordingly, the connection terminal 200 according to the present invention may include the plurality of the curved portions such that the height of the connection terminal 200 can be reduced to make the mobile terminal slimmer. In addition, the horizontal direction force is applied only to prevent the battery 191 from separated from the battery loading part 104. The connection terminal 200 performs the rotation partially and connection reliability between the battery 191 and the connection terminal 200 can be enhanced.

Figure 7:
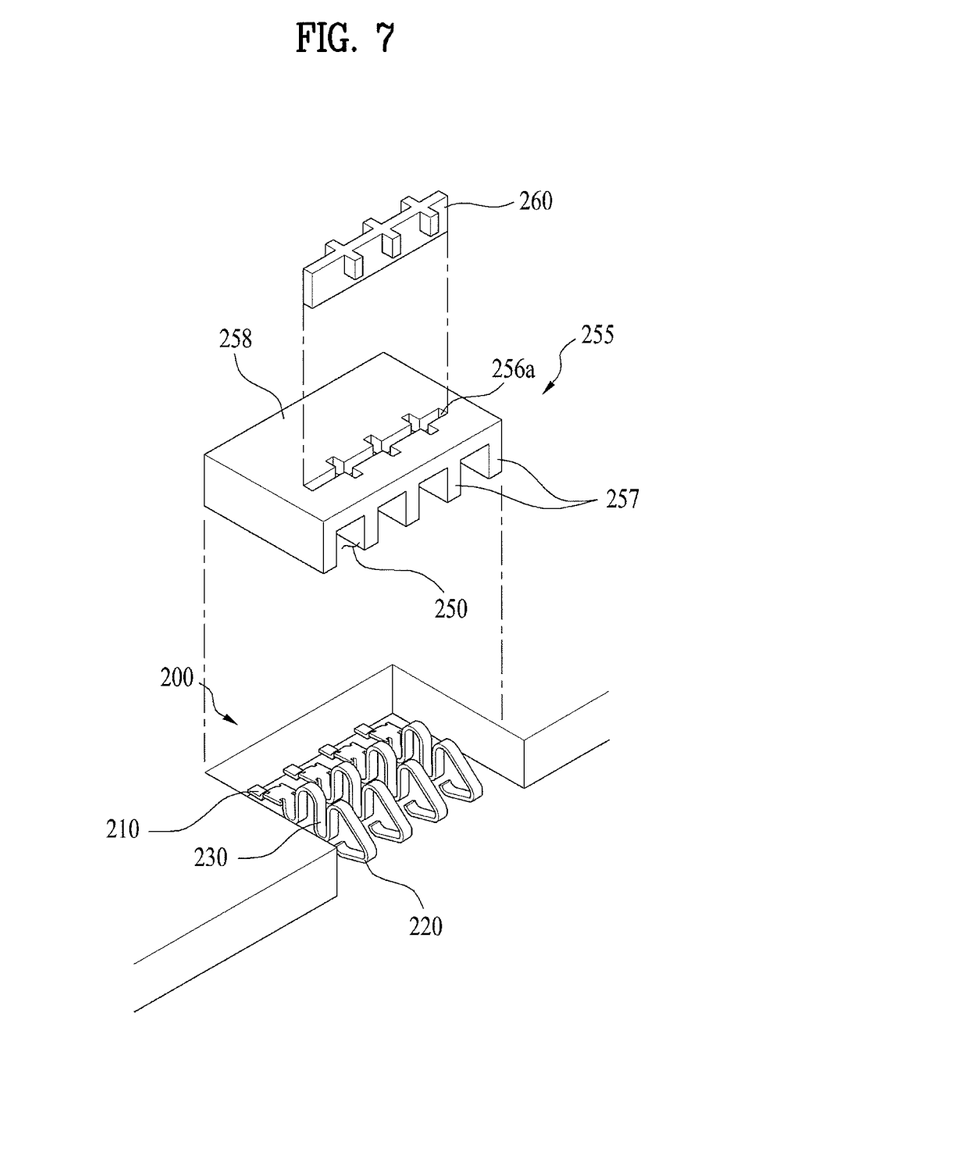
FIG. 7 is an exploded perspective diagram of a battery terminal for the mobile terminal according to a first embodiment of the present invention.

The fixing part 210 arranged in the end of the connection terminal 200 may be wider than the remainder of the connection terminal 200 as shown in FIG. 7, to enhance the reliability of connection with the electronic component.

The connecting part 220 arranged in the other end of the connection terminal 200 is formed by curving a long ribbon-shaped connection terminal 200 in a triangle shape as shown in FIG. 4. The triangle-shaped connection terminal 200 may guide the loading and unloading of the battery 191 stably and smoothly. Also, the triangle-shaped connection terminal 200 consists of an upper inclined portion and a lower inclined portion. The upper inclined portion guides the smooth insertion of the battery 191 and the lower inclined portion prevents the connecting part 220 from contacting with a bottom of the terminal connection accommodating space 250, when the connecting part 220 rotates.

The connecting part 220 is exposed outside and provided with the force directly, only to be damaged. To prevent such damage, the connecting part 220 may include a reinforcing part 225 provided in a lateral side thereof As shown in the drawing, the reinforcing part 225 may be formed by bending a wind portion projected in a width direction of the plate-shaped connection terminal 200.

The shape of the reinforcing part 225 may be determined to cover a lateral side to make the inside of the hole via the lateral side of the connecting part 220. The reinforcing part 225 can be formed in the triangle shape, corresponding to a lateral side shape of the connecting part 220.

The stopper 260 arranged in the terminal connection accommodating space 250 according to the present invention has to be inserted between curved portions of the connection terminal 200. Accordingly, it is not easy to insert the connection terminal 200 having curved several times in the projected terminal connection accommodating space 250.

Accordingly, an auxiliary mold 255 may be attached to an end of the battery loading part 104 formed in the case to form the terminal connection accommodating space 250 according to the present invention, as shown in FIG. 7. In other words, a top side and a lateral side of the terminal connection accommodating space 250 may be formed by the mold 255 attached to the battery loading part 104 and a bottom side of the terminal connection accommodating space 250 may be formed by the bottom side of the battery loading part 104.

The attaching process will be described more specifically, referring to FIG. 7. First of all, the fixing part 210 of the connection terminal 200 is fixed to be electrically connected with the inner components of the mobile terminal. After that, the mold 255 is attached to arrange the connection terminals 200 between lateral walls of the mold having a plurality of lateral walls and a top side.

The terminal connection accommodating space 250 is defined by the lateral walls and the top side of the mold 255 and the bottom side of the battery loading part 104. The connecting part 220 of the connection terminal 200 is exposed via the terminal connection accommodating space 250. At this time, as shown in FIG. 7, a stopper coupling groove 256*a* is formed in the top side of the mold 255 and the stopper 260 may be inserted in the stopper coupling groove 256*a*.

In FIG. 7, the terminal connection accommodating space 250 having the mold 255 with an open side is shown. The connection terminal 200 is coupled and the mold 255 is attached thereon. However, in case four sides (top, bottom, right and left sides) of the terminal connection accommodating space 250 are stopped, the stopper 260 allows the connection terminal 200 inserted in the terminal connection accommodating space 250 and the mold 255 inserted in an up and down direction, considering the position of the first curved portion 231 of the connection terminal 200.

The mold 255 may be attached to the mobile terminal case by using an adhesive or a screw. An embodiment shown in FIG. 8 uses a fitting member 265 more simply. Such a fitting member 265 is inserted in a coupling hole 259 formed in the mold to couple an end thereof to the case 102 or the printed circuit board 185.

Figure 9:
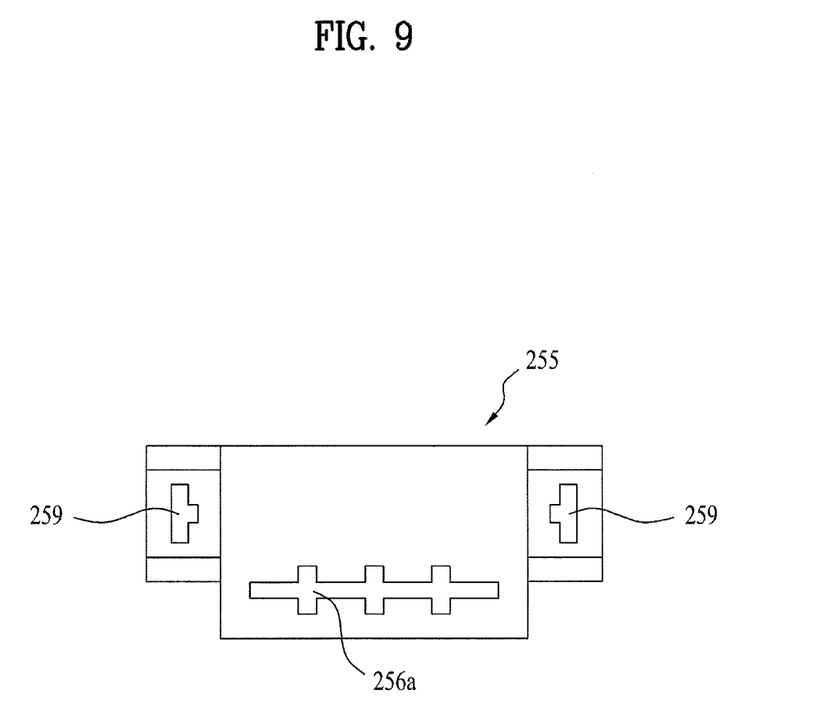
FIG. 9 is a plane diagram of a mold shown in FIG. 8.

A pair of coupling grooves 259 may be formed in both sides of the mold as shown in FIG. 9, to couple the mold to the case 012 or the printed circuit board 185 stably The fitting member 265 includes a projection 266 to be inserted in the coupling groove 259 smoothly. However, once the projection 266 is inserted in the coupling groove 259, the projection 266 is hooked and the fitting member 265 is not separated easily. The fitting member 265 may be formed of a metallic material for the elastic movement and rigidity.

Figure 8:
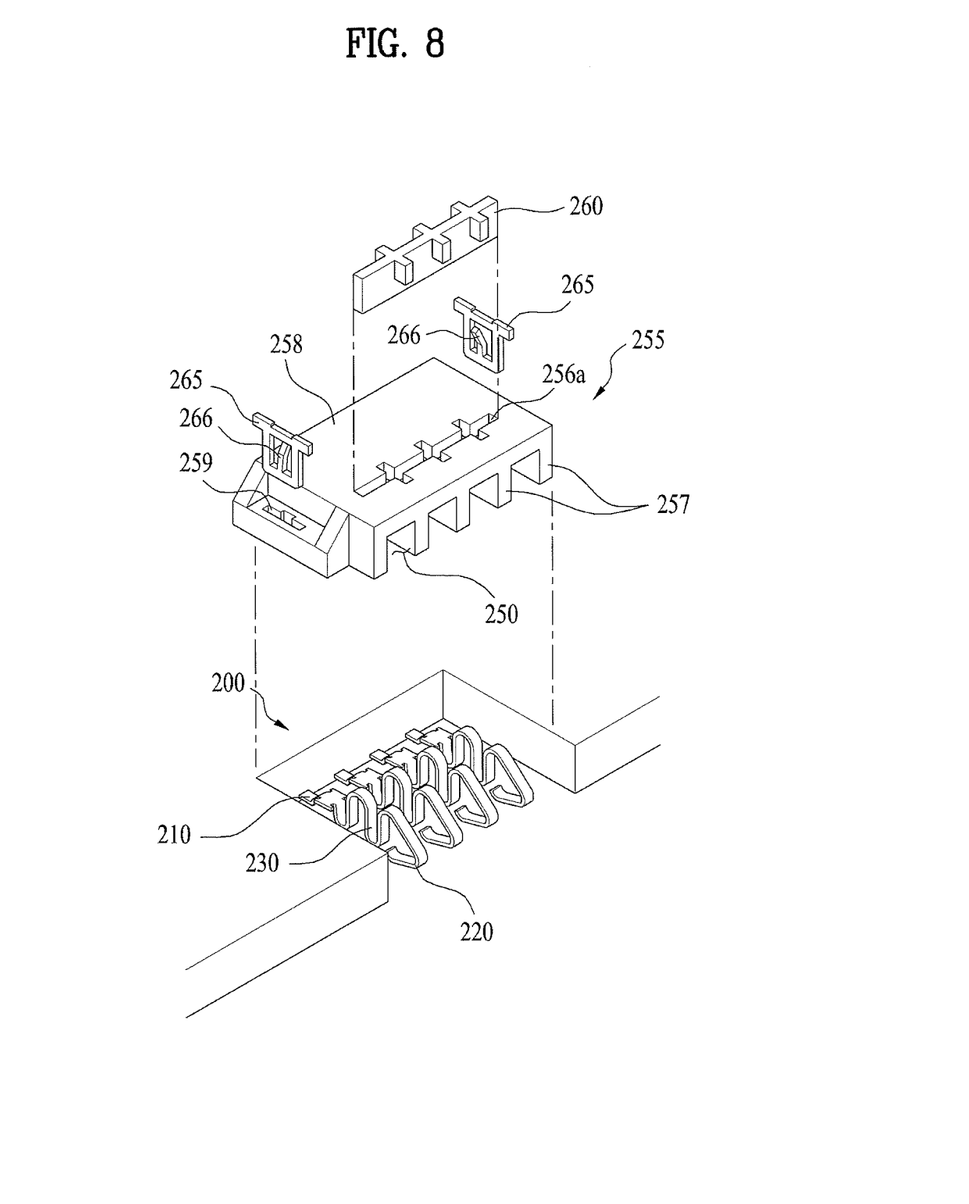
FIG. 8 is an exploded perspective diagram of a battery terminal for the mobile terminal according to a second embodiment of the present invention.
Figure 10:
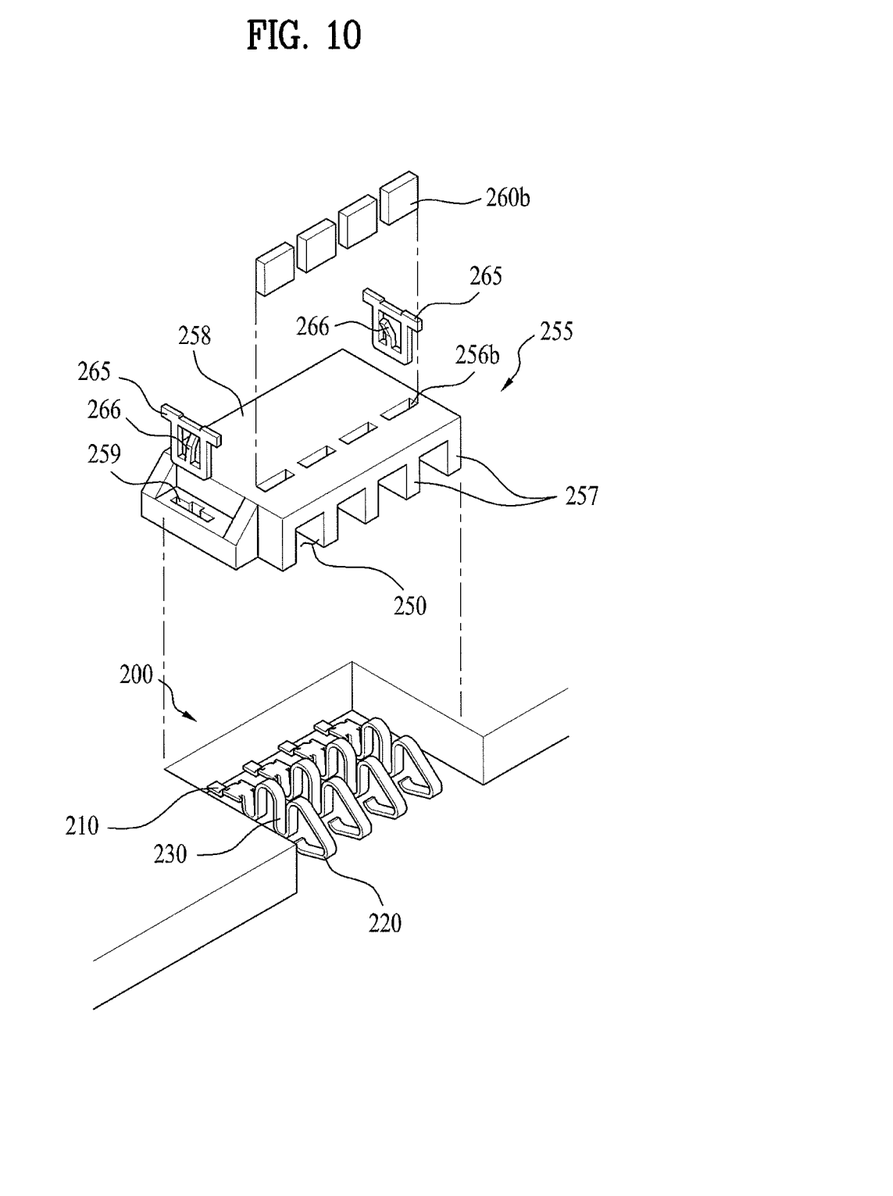
FIG. 10 is an exploded perspective diagram of a battery terminal for the mobile terminal according to a third embodiment of the present invention.

As shown in FIGS. 7 and 8, the stopper 260 configured of one member can be used. Optionally, as shown in FIG. 10, stoppers 260b may be formed for the terminal connection accommodating spaces 250, respectively. At this time, a plurality of stopper coupling grooves 256b may be formed and the number of the stopper coupling grooves may be corresponding to the number of the stoppers 260b.

In FIG. 10, the mold 255 can be coupled by using the fitting member 265 inserted in the coupling groove 259. Detailed description of the coupling process is the same as the description of the coupling groove 259 and the fitting member 265 mentioned in reference to FIG. 8.

In case the mold 255 is coupled to the upper portion of the connection terminal 200, the stopper 260 is projected from a top side of the mold 255 downward. Even if the mold 255a is integrally formed with the stopper 260c, it is not difficult to install the connection terminal 200.

Figure 11:
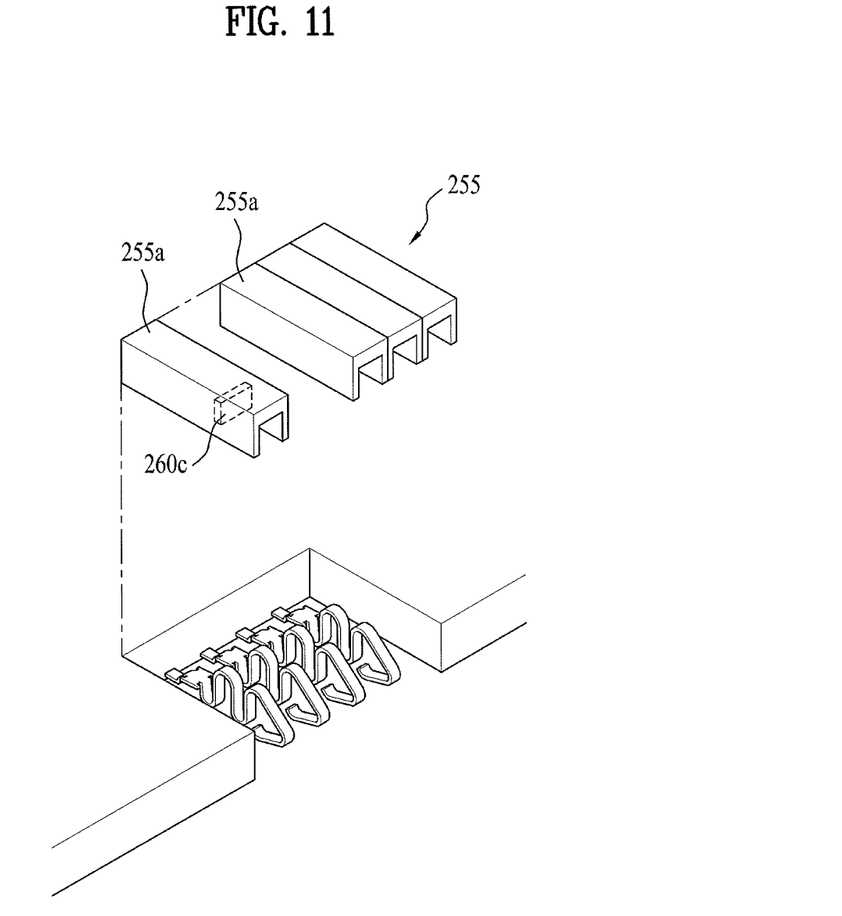
FIG. 11 is an exploded perspective diagram of a battery terminal for the mobile terminal according to a fourth embodiment of the present invention.

The mold 255 may be integrally formed with all of the terminal connection accommodating spaces 250. However, as shown in FIG. 11, a plurality of unit molds 255a including only terminal connection accommodating spaces, respectively, 250 may be assembled to each other. In case of the unit molds 2550, an injection mold frame can be simple and other frames need not be fabricated according to the number of the terminals, only to couple the unit molds 255a to form the single mold 255.

In this instance, the stopper 260c may be integrally formed with the mold or inserted in the mold as shown in FIG. 10.

The mobile terminal including the connection terminal 200 described above can reduce the height of the battery connection terminal, only to make the mobile terminal simmer. In addition, the connection terminal 200 can perform the horizontal movement and the rotational movement, only to lower a connection failure rate.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A mobile terminal comprising:
    a case having a battery loading part to load a battery thereon;
    a printed circuit board mounted in the case;
    a terminal connection accommodating space formed in a predetermined portion of the battery loading part and extending in a first direction;
    a connection terminal comprising a fixing part configured to be connected to the printed circuit board, a connecting part extending toward the battery loading part via the terminal connection accommodating space, and a flexible part having a plurality of curved portions arranged between the fixing part and the connecting part;
    a stopper extending in the terminal connection accommodating space to restrict contraction of the flexible part in the first direction by coming into contact with one of the curved portions when the flexible part is contracted; and
    a reinforcing part covering a lateral side of the connecting part to prevent exposing inside of the terminal connection accommodating space via the lateral side of the connecting part,
    wherein a shape of the reinforcing part corresponds to a lateral side shape of the connecting part.

2. The mobile terminal according to claim 1, wherein said one of the curved portions is a first curved portion positioned nearest to the connecting part.

3. The mobile terminal according to claim 2, wherein the first curved portion is located in an upper portion of the terminal connection accommodating space.

4. The mobile terminal according to claim 2, wherein, once the first curved portion of the flexible part contacts the stopper, only the first curved portion is elastically deformed such that the connecting part is caused to rotate with respect to the first curved portion.

5. The mobile terminal according to claim 1, further comprising:
    a mold coupled to the predetermined portion of the battery loading part, the mold being configured to define a top side and a lateral side of the terminal connection accommodating space,
    wherein a bottom side of the terminal connection accommodating space is defined by an outer side of the case.

6. The mobile terminal according to claim 5, wherein a stopper coupling groove is located in a top side of the mold, and
    wherein the stopper is inserted into the stopper coupling groove to extend toward the bottom side of the terminal connection accommodating space.

7. The mobile terminal according to claim 5, wherein the terminal accommodation space is formed as a plurality of terminal accommodating spaces,
    wherein the mold is configured to define top surfaces and lateral sides for each of the plurality of terminal accommodating spaces, and
    wherein the stopper is configured to be coupled to the plurality of the terminal connection accommodating spaces simultaneously.

8. The mobile terminal according to claim 5, wherein the terminal accommodation space is formed as a plurality of terminal accommodating spaces,
    wherein the mold is configured to define top surfaces and lateral sides for each of the plurality of terminal accommodating spaces, and
    wherein the stopper is provided as a plurality of stoppers and each stopper is coupled to a corresponding terminal accommodating space.

9. The mobile terminal according to claim 5, wherein the stopper extends from the top side of the terminal accommodating space towards the bottom side of the terminal accommodation space, and
    wherein the stopper is integrally formed with the mold.

10. The mobile terminal according to claim 5, wherein the terminal accommodation space is formed as a plurality of terminal accommodating spaces,
    wherein the mold includes of a plurality of unit molds, each unit mold defines a top side and lateral sides of a corresponding terminal accommodating space of the plurality of terminal accommodating spaces, and wherein the stopper is provided as a plurality of stoppers and each stopper is coupled to the corresponding terminal accommodating space.

11. The mobile terminal according to claim 5, wherein the mold further includes a coupling groove formed through a top side of the mold; and a fitting member inserted in the coupling groove to couple an end thereof to one of the case and the printed circuit board.

12. The mobile terminal according to claim 1, wherein the connecting part is formed by bending an end of the connection terminal opposite the fixing end to provide a lateral side thereof in a shape of a triangle.

13. The mobile terminal according to claim 1, wherein the reinforcing part is formed by bending downward wing parts extending from both sides of the connection terminal in a width direction of the connection terminal.

14. The mobile terminal according to claim 1, wherein the fixing part is formed wider than the remainder of the connection terminal.

15. The mobile terminal according to claim 1, wherein in the first direction extends along a longitudinal direction of the case.

* * * * *